Oct. 6, 1953

W. TRAUPEL 2,654,216

METHOD AND DEVICE FOR REGULATING THE OUTPUT
AND PRESSURE CONDITIONS OF THE WORKING
MEDIUM IN GAS TURBINE PLANTS

Filed June 1, 1950

INVENTOR:
WALTER TRAUPEL
BY K. A. Mayr
ATTORNEY.

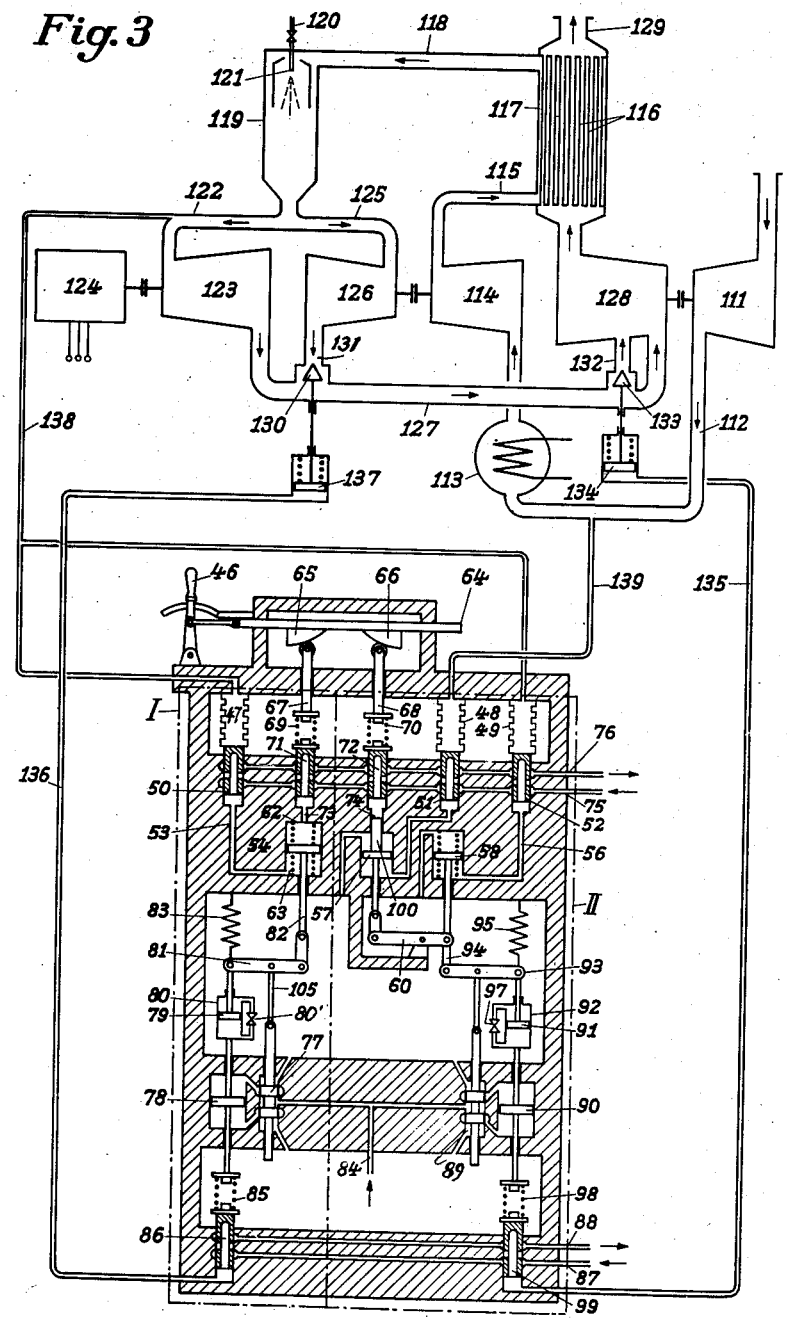

Patented Oct. 6, 1953

2,654,216

UNITED STATES PATENT OFFICE 2,654,216

METHOD AND DEVICE FOR REGULATING THE OUTPUT AND PRESSURE CONDITIONS OF THE WORKING MEDIUM IN GAS TURBINE PLANTS

Walter Traupel, Winterthur, Switzerland, assignor to Sulzer Freres, Societe Anonyme, Winterthur, Switzerland, a corporation of Switzerland Application June 1, 1950, Serial No. 165,457
In Switzerland June 8, 1949

8 Claims. (Cl. 60—39.03)

1

The invention relates to a method for regulating the pressure of the working medium of a gas turbine plant comprising at least two compressors, which are mechanically independent of each other and connected in series in the path of the working medium, and to a regulating device for performing the method.

In such plants, the speed of the two compressors or groups of compressors must be regulated individually by regulating, for example, the speed of the machines driving the compressors. Considering the characteristics of the compressors which cannot always be calculated in advance, and also casual external influences, such as the temperature of the outside atmosphere, etc., it has been attempted to use as regulating impulses, instead of the speed of the compressors, the pressures of the compressed media, which pressures depend on the speed of the compressors. It is therefore obvious to construct the control so that the position of a power output control lever determines the required pressures of the media at the outlet of the compressors or groups of compressors. This conventional arrangement has the following disadvantage:

In gas turbine plants, which comprise relatively large heat exchange apparatus for the purpose of attaining a good thermal efficiency, parts of the system interposed between the groups of high pressure compressors and the turbine or turbines connected therewith hold a large volume of medium. An increase in the speed of the group of high pressure compressors, therefore, effectuates only a slow increase of the pressure in this system, as large spaces must be filled with compressed medium. The result of this is that the reaction of the high pressure group to load variations is considerably slower than that of the low pressure group because relatively small spaces must be filled with medium leaving the low pressure group. This different reaction causes considerable operating difficulties when the output of the plant is increased. There is even a possibility that, at a relatively rapid drop in the pressure of the working medium leaving the low pressure group, the pressure of the medium leaving the high pressure group decreases only slowly, so that the pressure conditions in the high pressure group may temporarily assume such proportions that its capacity is exceeded and, under certain circumstances, the flow of the working medium through the high pressure group may be reversed.

It is an object of the present invention to provide a method and means for regulating gas turbine plants, whereby the above described disadvantages are avoided. According to the invention, in a gas turbine plant having a low pressure and a high pressure compressor, a regulating device is provided which adjusts the outlet pressure of one of said compressors in dependence on the outlet pressure of one of the two compressors, and a second regulating device is provided which adjusts the outlet pressure of the other compressor in dependence on the ratio between the outlet pressures of both compressors.

The means for performing the method according to the invention may comprise two feelers, which are individually sensitive to the outlet pressure of two compressors, and may have an individual regulating device for the adjustment of the outlet pressure of each compressor, which devices are actuated by the feelers in such a manner that the regulating device of one compressor operates in dependence on the outlet pressure of one of the two compressors and the other regulating device operates in dependence on the ratio between the outlet pressures of both compressors.

By means of a further regulating device, the so controlled ratio between the two outlet pressures can be temporarily changed. With this additional regulating device, the pressure ratio can be temporarily altered during an adjustment of the regulating device in accordance with the magnitude of said adjustment. In the case of a gas turbine plant in which each of the compressors is driven by a turbine, the compressor outlet pressures can be adjusted according to one of the outlet pressures or to their proportion, for example by means of a regulating device which adjusts the medium flow through a by-pass in at least one turbine.

Further and other objects of the present invention will be hereinafter set forth in the accompanying specification and claims, and are shown in the drawings which, by way of illustration, show what I now consider to be preferred embodiments of the invention.

In the drawings:

Fig. 1 diagrammatically illustrates a gas turbine plant equipped with a regulating mechanism according to the invention;

Fig. 2 is a schematic illustration of a regulating device according to the invention;

Fig. 3 diagrammatically illustrates a modified gas turbine plant and shows schematically a modified regulating device for its control;

Like parts are designated at like numerals in all figures of the drawings.

Figure 1:
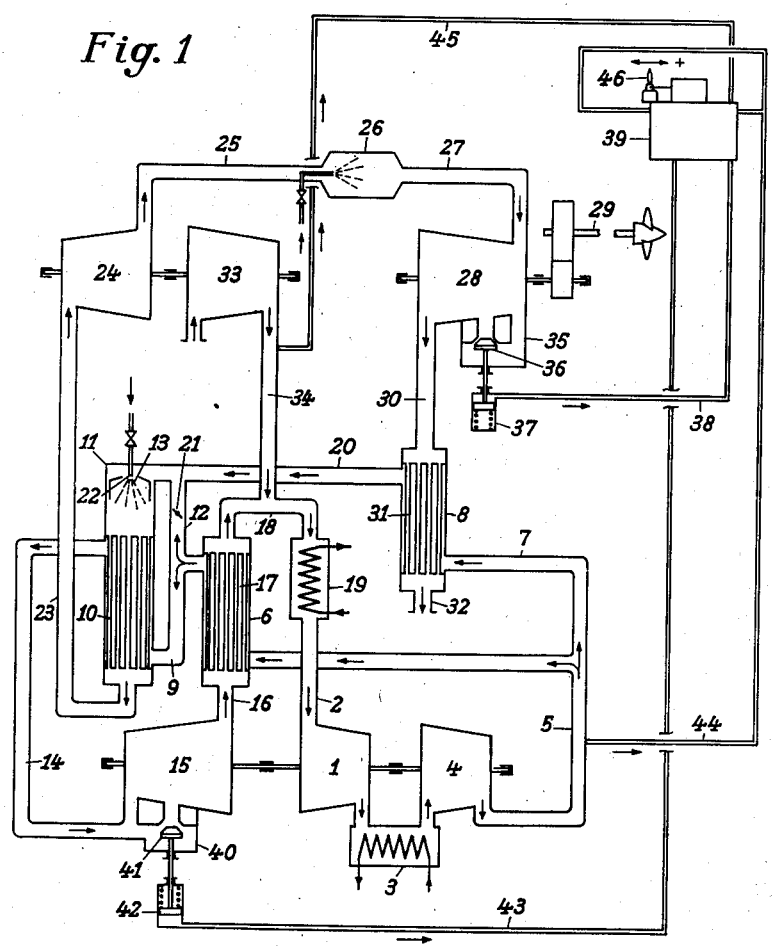

Referring more particularly to Fig. 1 of the drawings, compressor 1 compresses the working medium received from conduit 2. Thereupon the medium is cooled in intercooler 3 and then further compressed in compressor 4 to the top pressure of the cycle. The high pressure working medium flows through conduit 5 from which a portion of the medium is diverted into heat exchanger 6 and the remainder flows through conduit 7 into heat exchanger 8. One part of the working medium pre-heated in heat exchanger 6 is conducted by means of conduit 9 around the tubes of a gas heater 11, and the other part flows through conduit 12 into combustion chamber 13 of the gas heater 11. The part of the working medium which is indirectly heated in tubular heater 10 flows through conduit 14 into turbine 15 and, after being expanded, reaches tube system 17 of the heat exchanger 6 through conduit 16. Here, a part of the heat still contained in the expanded working medium is transferred to working medium coming from compressor 4. The expanded and cooled working medium flows through conduit 18 into a cooler 19 and is returned, in cooled state, through conduit 2 to compressor 1 to resume the cycle set forth above.

The part of the working medium withdrawn from the described circuit through conduit 7 reaches combustion chamber 13 of gas heater 11 through the space surrounding tube system 31 of heat exchanger 8 and conduit 20. The part of the working medium withdrawn from the circuit through conduit 12 can be adjusted by means of a regulating device 21 and is also conducted into combustion chamber 13 and serves together with the working medium coming from conduit 20 for supporting combustion of fuel atomized in a nozzle 22. The resulting hot mixture of original working medium and combustion gases flows through the tube system 10 of gas heater 11 and transfers a part of its heat to the working medium of the circuit coming from conduit 9. Thereupon the mixture flows through conduit 23 into charging turbine 24 and, after being expanded to an intermediate pressure, flows through conduit 25 into an intermediate gas heater 26. The re-heated mixture is conducted through conduit 27 into turbine 28, in which it is expanded to atmospheric pressure while producing power for driving propeller shaft 29. The exhaust gases pass through conduit 30 into tube system 31 of the heat exchanger 8, where a remaining part of heat is transferred to the part of the medium withdrawn from the circuit through conduit 7. Thereupon the gas mixture leaves the plant through outlet 32.

As replacement for the working medium withdrawn from the circulation system through conduit 7, air is drawn from the atmosphere by the compressor 33 and supplied in compressed state to the system through conduit 34 which terminates in conduit 18.

For adjustment of the amount of working medium flowing through the outside power turbine 28, the latter is equipped with a by-pass 35 by-passing the first turbine stages and comprising a flow regulating device 36. A servomotor 37 for operating device 36 is actuated by pressure fluid in conduit 38, which is connected with a regulator II, (Fig. 2), which is accommodated in regulator box 39.

For adjustment of the amount of working medium flowing through the auxiliary turbine 15 of the system, the turbine is equipped with a by-pass 40 by-passing the first turbine stages and comprising a flow regulating device 41, the servomotor 42 of which can be actuated through the impulse conduit 43 by a regulator I, which is also accommodated in the regulator box 39.

The regulating device II is controlled by the pressure in the outlet conduit 5 of the high pressure compressor 4, which pressure is transmitted by means of conduit 44 and by the pressure in the outlet conduit 34 of the charging compressor 33 transmitted by means of conduit 45. The output of turbine 28, which is controlled by the regulating device according to the invention, can be adjusted by manipulation of lever 46.

An increase of the flow area in the by-pass 35 of the outside power turbine 28 due to opening of by-pass valve 36 effected by the regulator II causes a drop in the pressure of the working medium in the outlet of the charging turbine 24. This reduced exhaust pressure increases the pressure drop through, and consequently the speed of, turbine 24 and of the charging compressor 33 connected thereto so that the pressure in the whole system rises. A decrease in the flow area in by-pass 35 of the outside power turbine 28 reduces power production of the charging turbine 24 and consequently reduces the speed of compressor 33, causing a decrease of the pressures in the whole plant. The regulator I is actuated by the pressure in the outlet conduit 5 of the high pressure compressor 4, which pressure is transmitted to the regulator by means of conduit 44.

If the flow area in by-pass 40 of turbine 15 is increased by opening valve 41, which is controlled by regulator I, turbine 15 can swallow more operating medium and an increased amount of medium is made available for the high pressure compressors, resulting in increased power production of all turbines and increased pressure in the system. A decrease of the flow area in the by-pass 40 reduces the output of turbine 15 and consequently the speed of the compressors driven thereby and decreases the pressure in the system.

Figure 2:
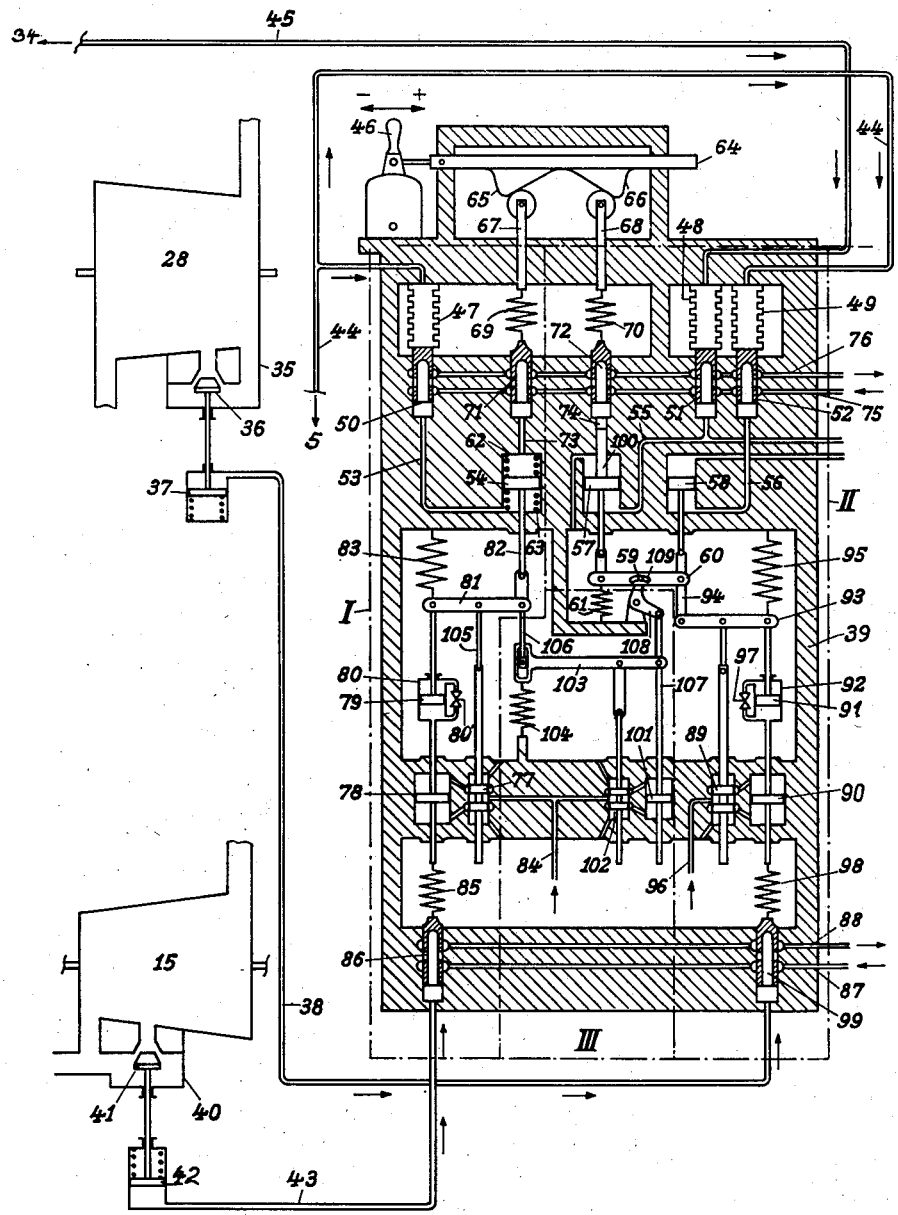

The regulator box 39 and the regulators I and II with the connected regulating devices 36 and 41 of Fig. 1 are shown diagrammatically in Fig. 2. The parts constituting the regulators I and II, and a regulator III to be described later, are surrounded by dash-dot lines in Fig. 2.

Regulator I is controlled by the pressure in an elastic chamber 47 connected to conduit 45; regulator II is controlled by the pressure in elastic chamber 48 connected to conduit 45 and by the pressure in elastic chamber 49, which is connected to conduit 44. The lower ends of chambers 47, 48, and 49 are connected with control valves 50, 51, and 52, respectively. These control valves regulate the flow of a pressure fluid from a source of supply through conduit 75 into devices to be described later or back to the source through conduit 76. Due to the pressure exerted on the control valves by the action of the elastic containers, the pressure of the pressure fluid, for example oil, under the control valves 50 and 52 is proportional to the pressure in the outlet conduit 5 of the compressor 4. Likewise, the pressure under control valve 51 is proportional to the pressure in the outlet conduit 34 of the charging compressor 33. The pressure under valve 50 acts through conduit 53 on the lower side of a piston 54, and the pressures under valves 51 and 52 are transmitted through conduits 55 and 56, respectively, below pistons 57 and 58, respectively. For the time being, the change of location of the fulcrum of a two-arm lever 60, whose ends are connected with pistons 57 and 58, by regulator III, which is to be described later, is not considered. Regulator III is also accommodated in the regulator box 39 and is controlled by means of piston 54 when the output control lever 46 is manipulated.

Pistons 57 and 58 of the regulating device II are mechanically connected with the ends of lever 60 and are held in their central position by a spring 61 having one end connected with lever 60 and the other with a portion of the regulator casing 39. Piston 54 of the regulating device I is held in central position by positioning springs 62 and 63. Thus the pressure prevailing in container 47 is the deciding factor for the position of piston 54, whereas the positions of pistons 57 and 58 depend on the proportion of the two pressures in the containers 48 and 49 and on the leverage of the levers with which the pistons are connected.

When moving the output control lever 46 between the extreme positions marked "Minus" and "Plus," rod 64 which is linked to lever 46 and has cam portions 65 and 66 is moved between positions corresponding to no load and highest overload of the power plant.

The position of cams 65 and 66 determines the positions of the cam followers 67 and 68, respectively. The latter are connected with the control valves 71 and 72 by springs 69 and 70, respectively. Depending on the position of cams 65 and 66, the springs 69 and 70 are more or less compressed and the positions of control valves 71 and 72, respectively, are so adjusted that the pressure of the pressure fluid in conduit 73 and cylinder 74, respectively, correspond to the spring tensions.

The pressure in conduit 73 which communicates with the underside of control valve 71 acts on the upper side of piston 54 of regulator I. Piston 54 is also connected with a control mechanism comprising a valve 77 controlling pressure fluid flow to and from a servomotor having a piston 78; the mechanism being equipped with a yielding follow-up device for avoiding over-regulation and fluctuations resulting therefrom.

Rigidly connected with piston 78 is a dash-pot cylinder 80 containing a piston 79 which is connected with one end of a lever 81. A spring 83 is interposed between said arm and the housing 39. This spring tends to hold piston 77, which is connected with lever 81 by means of a link 105, in its center position, in which condition no pressure fluid can flow from conduit 84 into or from the cylinder containing piston 78. The tension of spring 83 moves piston 79 in cylinder 80 whereby pressure fluid flows through throttle valve 80' from one piston chamber into the other. A regulating mechanism of this type comes to rest only when it is in neutral position. This is the case if the pressure is the same at both sides of piston 54. The pressure on the upper side of piston 54 is determined by the position of cam 65, which is connected with the output regulating lever 46.

Regulator I acts on control valve 86, which is connected with the servomotor piston 78 by means of a spring 85. Valve 86 controls the flow of pressure fluid from conduit 87 and to conduit 88, and thereby controls the pressure in conduit 43, which acts on piston 42 and actuates valve 41 in the by-pass of turbine 15.

Rod 82 of piston 54 is linked to one end of lever 81 whose other end is connected through dash-pot device 79, 80 with servomotor piston 78. The latter, through spring 85, acts on valve 86 and thereby on valve 41 until the pressure in conduit 5, which acts through conduit 44 and bellows 47 on valve 50 and thereby on piston 54, has reached the original value after it has been disturbed by the change in position of cam 65.

Regulator II operates in a similar manner. It comprises a piston valve 89 controlling flow of pressure fluid from a conduit 96 to and from a servomotor cylinder containing piston 90, and is also equipped with a yielding return motion or neutralizing mechanism. For the time being, it is assumed that the fulcrum 59 of lever 60 is stationary. The right end of lever 60 is connected by a link 94 to the left end of lever 93, which is linked to valve 89. The right end of lever 93 is connected by a spring 95 to the interior of the regulator housing 39 and, by means of a dash-pot device comprising cylinder 92, piston 91, and throttle valve 97, to piston 90. Spring 95 tends to hold valve 89 in its middle position, in which condition no pressure fluid flows to or from the servomotor comprising piston 90 and the position of the latter is retained after each load changing operation. For effecting neutral position of valve 89, lever 60 must be in its middle (horizontal) position, and not only must spring 95 be without tension but also spring 61 which is interposed between the part of lever 60 to which piston 57 is connected and the interior of regulator casing 39. Equilibrium is possible only at a certain relation between the forces acting on piston 57 and piston 58, the latter being connected with that part of lever 60 to which lever 93 is linked, i. e. there must be a certain relation between the pressure of the working medium in the outlet conduit 5 of compressor 4 and the pressure of the charging air in the outlet conduit 34 of compressor 33. If no other provisions were made, piston 90 would act on valve 99, with which it is connected by a spring 98, until there was equilibrium between said spring and the pressure of the pressure fluid acting on valve 99 which controls the flow of pressure fluid from conduit 87 and to conduit 88 and thereby the pressure in conduit 39 connected to the valve and consequently the pressure acting on piston 37 for actuating valve 36 in the by-pass 35 of the power turbine 28.

When the output of the power plant is to be changed, the equilibrium of regulator II must be temporarily disturbed to effect a change in the position of valve 99. For this purpose, a trunk 100 is provided on the upper side of piston 57, which trunk forms a piston in cylinder 74 which communicates with the underside of valve 72. The pressure in cylinder 74 is determined by the position of valve 72 which is connected by a spring 70 with the cam follower 68 and follows the movements of cam 66 which is connected with the power output control lever 46. The pressure which is controlled by valve 51 whose position depends on the pressure in conduit 34 which is connected with the bellows 48, acts on the underside of piston 57. A force which is determined by the position of the power output lever, acts on the upper side of piston 57. Cam 66 is so formed that this force is decreased when lever 46 is moved to increase the power production of the plant, and the force is increased when lever 46 is moved to decrease power production.

So far, it has been assumed that the fulcrum of lever 60 is stationary. Regulator II, however, is also controlled by an additional regulator III which affects the position of fulcrum 59 of lever 60. For this purpose, fulcrum 59 moves in a slot 109 in lever 60 and is placed at one end of an elbow lever 108 whose other end is connected with a piston 101 through a rod 107. To the latter, one end of a lever 103 is swingably connected. The other end of lever 103 is connected with the interior of casing 39 by means of a spring 104. Also linked to lever 103 is a valve 102 which controls the flow of pressure fluid from conduit 84 to and from the cylinder of piston 101. When the system is in equilibrium, there is no tension on spring 104, and lever 103 is in its middle position. The left end of the latter is provided with a transverse guide in which slides one end of rod 106 whose other end is connected with the right end of lever 81, which is also linked to the rod 82 of piston 54. Each movement of piston 54 in excess of the length of the guide on lever 103 causes movement of the latter and of valve 102, whereby the position of piston 101 and consequently the positions of lever 108 and of fulcrum 59 of lever 60 are changed. In this way, change of position of output lever 46 or of the pressure in bellows 47, i. e. in conduit 5, will change the pressure ratio at which lever 60 is in neutral position, so that, at a substantial and sudden increase of power output, the ratio of the pressure in the outlet conduit 5 of the high pressure compressor to the pressure at the outlet of compressor 33, i. e. in conduit 34, is temporarily reduced. A substantial and sudden decrease in the load of the power plant causes a temporary increase of said pressure ratio.

Fig. 3 illustrates a modified control system according to the invention, which comprises only two regulators, I and II, and omits regulator III. In the plant which is controlled by the system according to Fig. 3, air is drawn from the atmosphere by a compressor 111 and conducted to compressor 114 through conduit 112 in which an intercooler 113 is arranged. The air which is now compressed to the maximum pressure of the cycle, then flows through conduit 115 into the space surrounding tube system 116 of heat exchanger 117. The so pre-heated air passes through conduit 118 into the combustion chamber of a gas heater 119 in which a part of the air serves for burning the fuel supplied to the gas heater through conduit 120 and atomized in nozzle 121. The resulting hot mixture of air and combustion gases flows in part through conduit 122 into turbine 123, in which it expands to an intermediate pressure and produces outside power by driving an electric generator 124. Another part of the air is conducted through conduit 125 into turbine 126, which drives the compressor 114. After expansion in the two turbines, the two streams of operating medium are re-united and flow through conduit 127 into a third turbine 128, which drives the compressor 111. After being expanded to substantially atmospheric pressure in turbine 128, the working medium is conducted through the tube system 116 of the heat exchanger 117, in which part of its remaining heat serves for pre-heating the fresh air on its way to the gas heater 119 through conduit 118. Thereupon, the working medium leaves the plant through outlet 129.

For adjustment of the amount of working medium flowing through turbine 126, the outlet of the latter is equipped with a valve 130, which is controlled by regulator I. Valve 130 is connected to and actuated by a servomotor piston 137 which is operated by the pressure in conduit 136 which is connected with regulator I. Turbine 128 is equipped with a by-pass 132 by-passing the first stages of the turbine and controlled by a valve 133. The servomotor 134 of this valve is actuated by means of the pressure of the fluid in conduit 135 which is connected to regulator II.

The pressure of the working medium in the outlet conduit 122 of the gas heater 119 is transmitted through conduit 138 to bellows 47 and 49, and the pressure of the working medium in the outlet conduit 112 of the charging compressor 111 is transmitted by means of the conduit 139 to bellows 48.

A decrease of the flow area in the outlet 131 of the turbine 126 driving compressor 114 effectuates a decrease in the heat drop in the turbine. This causes a reduction of power output by turbine 126 and a decrease of the speed of compressor 114 and consequently a decrease in the maximum pressure of the working medium in the circuit. An increase in the flow area by means of valve 130 effectuates a rise of the maximum pressure.

An increase in the flow area of the by-pass 132 of turbine 128 driving compressor 111 increases the amount of working medium wallowed by this turbine and decreases the pressure in conduit 127 and changes the heat drop in the turbine.

The regulators I and II in Fig. 3 correspond in their construction and their method of operation exactly to the regulators I and II illustrated in Fig. 2. The regulator I for controlling the pressure produced in compressor 114 is actuated by the pressure produced in one of the compressors, 114 in the illustrated embodiment of the invention, and the second regulator, II, which controls the pressure produced in the other compressor, 111, is actuated by the ratio between the outlet pressures of both compressors. What has been said in the description of Figures 1 and 2 applies also to the system shown in Figure 3, in which the elements which are like the elements in Figure 2 are designated by the same numerals. In the regulating device according to Fig. 3, regulator III is omitted, and the fulcrum of lever 60 is stationary. Incorporation of a regulator III in the control system is not limited to the use of the system according to the invention in a gas turbine power plant as shown in Figure 1.

Figure 4:
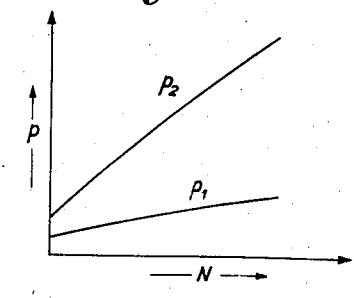
Fig. 4 is a diagram in which the outlet pressures of two compressors for the working medium of a gas turbine plant are plotted against the power output of the plant at steady operating conditions.
Figure 5:
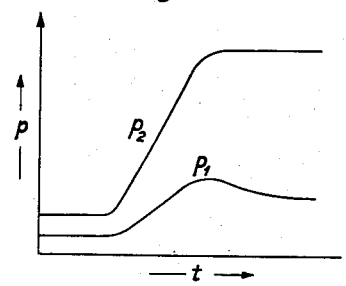
Fig. 5 is a diagram in which the outlet pressures of two compressors for the working medium of a gas turbine plant are plotted against time during a period when the output of the plant is increased.

The effect of the control systems according to the invention is illustrated in the diagrams Figs. 4 and 5. Fig. 4 shows the pressures $p_1$ of the operating medium in the outlet of the charging compressor 33 and the pressures $p_2$ in the outlet of cycle compressor 4 at steady load conditions. The control system automatically adjusts the pressures $p_2$ required for producing the desired power output N by the plant and simultaneously controls the ratio $p_2:p_1$ so that this ratio increases with increasing power output.

Figure 5 shows the pressure $p_1$ and $p_2$ at time moments during a period in which the load or power output of the plant is increased. As shown in the diagrams, the pressure $p_1$ of the charging air, i. e. of the air which replaces the operating medium leaving the plant at 32, rises at first above the pressure required for the desired output and is adjusted to the required pressure after $p_2$ has reached the pressure required for the desired output.

The invention is not limited to the embodiments and arrangements shown in Figs. 1 to 3. The method according to the invention may be performed by different control devices which may be actuated mechanically, hydraulically, pneumatically, or electrically.

A person skilled in the art may adapt the method and means according to the invention for the control of closed cycle gas turbine plants, a semi-closed cycle and an open cycle plant having been shown by way of example only.

I claim:

1. The method of regulating a gas turbine plant having an output turbine and two mechanically independent turbine driven compressors arranged in series with respect to the flow of operating medium therethrough, said method comprising automatically maintaining a predetermined compression pressure of one compressor and a predetermined ratio of the compression pressure of the high pressure compressor to that of the low pressure compressor, and increasing said predetermined pressure and ratio of pressures upon an increase of the output of the plant, and decreasing said predetermined pressure and said predetermined ratio of the compression pressure of the high pressure compressor to that of the low pressure compressor upon a decrease of the output of the plant.

2. The method of regulating a gas turbine plant having an output turbine and two mechanically independent turbine driven compressors arranged in series with respect to the flow of operating medium therethrough, said method comprising controlling the compression pressure of one compressor and the ratio of the compression pressures of both compressors in dependence on the output of the plant for increasing said compression pressure and said ratio upon an increase of output and for decreasing said compression pressure and said ratio upon a decrease of the output of the plant, and of additionally controlling the ratio of the compression pressures of both compressors in dependence on the change of the compression pressure of the compressor whose compression pressure is controlled.

3. A system for controlling the pressure of the working medium of a gas turbine plant, comprising an output turbine, at least two mechanically independent gas turbines, a compressor connected with and driven by each of said mechanically independent turbines for compressing the working medium of the plant, said compressors being connected in series with respect to the flow of the working medium therethrough, each compressor having an outlet conduit, conduit means connected with the outlet conduit of that one of said compressors which is the second with respect to the flow of the working medium, said conduit means being connected with said turbines for supplying working medium thereto, heating means interposed in said conduit means for heating the working medium for said turbines, a pressure sensitive means connected with each of said outlet conduits and being individually responsive to the pressure of the working medium produced in said compressors, a mechanism connected with both of said pressure sensitive means and being responsive to the ratio of the pressures of the working medium in said conduits, at least one of said turbines having a by-pass conduit by-passing first stages thereof, valve means in said by-pass conduit, and regulator means connected with said mechanism and with said valve means for operating the latter by the former, to regulate the flow of working medium through the turbine having a by-pass conduit to maintain a predetermined ratio of the working medium pressures produced in said compressors.

4. A system for controlling the pressure of the working medium of a gas turbine plant, comprising an output turbine, at least two mechanically independent gas turbines, a compressor connected with and driven by each of said mechanically independent turbines for compressing the working medium of the plant, said compressors being connected in series for the flow of the working medium first through one and then through the other compressor, each of said compressors having an outlet conduit, conduit means connected with the outlet conduit of the compressor through which the working medium flows secondly, said conduit means being connected with said turbines for supplying working medium thereto, heating means interposed in said conduit means for heating the working medium for said turbines, a pressure sensitive means connected with one of said conduits and being sensitive to the pressure of the working medium produced in one of said compressors, a pressure sensitive means connected with said conduit means and being sensitive to the pressure of the working medium produced in the other of said compressors, a mechanism connected with both of said pressure sensitive means and being responsive to the ratio of the pressures of the working medium produced in said compressors, at least one of said turbines having a by-pass conduit by-passing first stages thereof, valve means in said by-pass conduit, and regulator means connected with said valve means and with said mechanism for operating the former by the latter, to regulate the flow of working medium through the turbine having a by-pass conduit to maintain a predetermined ratio of the working medium pressures produced in said compressors.

5. A system for controlling the pressure of the working medium of a gas turbine plant, comprising an output turbine, at least two mechanically independent gas turbines, a compressor connected with and driven by each of said mechanically independent turbines, said compressors being connected in series for the flow of working medium first through one and then through the other compressor, conduits individually receiving working medium from said compressors, said turbines being connected with the conduit receiving working medium from that one of said compressors which is the second with respect to the flow of the working medium, heating means in said conduits for heating the working medium for said turbines, pressure sensitive means individually connected with said conduits and individually responsive to the working medium pressure produced in said compressors, two of said turbines individually having a by-pass conduit by-passing first turbine stages, valve means in each of said by-pass conduits, a first mechanism connected with one of said pressure sensitive means and responding to the pressure of the working medium in one of said conduits receiving working medium from one of said compressors, a regulator means connected with said first mechanism and with one of said valve means for operating the latter by the former and controlling the flow of working medium through the turbine in whose by-pass conduit is said last mentioned valve means to maintain a predetermined pressure of the working medium in that one of said conduits with which said last mentioned pressure sensitive means is connected, a second mechanism connected with both said pressure sensitive means and responding to the ratio of the pressures of the working medium in said conduits, a regulator means connected with said second mechanism and with the other of said valve means for operating the latter by the former and controlling the flow of working medium through the turbine in whose by-pass conduit is said last mentioned valve means to maintain a predetermined ratio of the working medium pressures in said conduits which receive working medium from said compressors.

6. A system as defined in claim 5 comprising hand operable control means connected with both said mechanisms and adapted to increase said predetermined pressure and said ratio of pressures for increasing the output of the plant and adapted to decrease said predetermined pressure and said ratio of pressures for decreasing the output of the plant.

7. A system for controlling the pressure of the working medium of a gas turbine plant, comprising an output turbine, at least two mechanically independent gas turbines, a compressor connected with and driven by each of said mechanically independent turbines, said compressors being connected in series for the flow of working medium first through one and then through the other compressor, conduits individually receiving working medium from said compressors, said turbines being connected with the conduit receiving working medium from that one of said compressors which is the second with respect to the flow of the working medium, heating means in said conduits for heating the working medium for said turbines, flow control means individually connected with at least two of said turbines for individually controlling the flow of operating medium through the turbines, a first pressure responsive means connected with one of said conduits and being responsive to the pressure of the operating medium produced in one of said compressors, two second pressure responsive means connected with the other of said conduits and being responsive to the pressure of the operating medium produced in the other compressor, a first mechanism connected with one of said two second pressure responsive means for actuation thereby and connected to and actuating the flow control means connected with one of said turbines to regulate the flow of operating medium through the last mentioned turbine to maintain a predetermined operating medium pressure in the conduit with which said second pressure responsive means are connected, a second mechanism connected with said first pressure responsive means and with the other of said two second pressure responsive means for actuation by both pressure responsive means and connected to and actuating the flow control means of another of said turbines to regulate the flow of operating medium through the turbine to maintain a predetermined ratio of the operating medium pressures in said conduits, and a hand operable control means connected with both said mechanisms and adapted to increase said predetermined pressure and said ratio of pressures for increasing the output of the plant and adapted to decrease said predetermined pressure and said ratio of pressures for decreasing the output of the plant.

8. A system as defined in claim 7, comprising a third mechanism connected with and responding to actuations of said first mechanism exceeding a predetermined magnitude and connected with said second mechanism for supplemental actuation thereof.

WALTER TRAUPEL.

References Cited in the file of this patent

UNITED STATES PATENTS

| Number | Name | Date |
|---|---|---|
| 2,095,991 | Lysholm | Oct. 19, 1937 |
| 2,306,277 | Oswald | Dec. 22, 1942 |
| 2,318,905 | Traupel | May 11, 1943 |
| 2,353,929 | Ray | July 18, 1944 |
| 2,374,708 | Shoults | May 1, 1945 |
| 2,375,006 | Larrecq | May 1, 1945 |
| 2,423,417 | Stokes et al. | July 1, 1947 |
| 2,472,924 | Schwendner | June 14, 1949 |
| 2,480,758 | Mock et al. | Aug. 30, 1949 |
| 2,500,234 | Bates | Mar. 14, 1950 |
| 2,565,482 | Dolza et al. | Aug. 28, 1951 |